United States Patent [19]

Hazen

[11] 3,757,223

[45] Sept. 4, 1973

[54] CIRCUIT CONNECTING DEVICE

[76] Inventor: Arthur L. Hazen, Box 211, Kermit, Tex. 79745

[22] Filed: Apr. 19, 1971

[21] Appl. No.: 90,231

[52] U.S. Cl. .................. 325/160, 325/105, 325/169

[51] Int. Cl. .............................................. H04b 1/04

[58] Field of Search .................. 179/1 SW; 325/105, 325/161, 162, 164, 165, 166, 169, 170, 152, 182, 187; 330/12, 51

[56] References Cited

UNITED STATES PATENTS

| | | | |
|---|---|---|---|
| 2,929,924 | 3/1960 | Miller | 325/169 X |
| 3,365,675 | 1/1968 | Gaddy et al. | 325/152 X |
| 3,614,321 | 10/1971 | Shaw et al. | 179/1 SW |

*Primary Examiner*—Benedict V. Safourek

[57] ABSTRACT

The SPST transmitter keying switch is used both to operate a transmitter keying relay and switch the audio amplifier power on and off. A diode is used to isolate the relay and amplifier power supplies.

1 Claim, 4 Drawing Figures

Arthur L. Hazen

Arthur L. Hazen

Arthur L. Hazen

Arthur L. Hazen

CIRCUIT CONNECTING DEVICE

My device includes a transistor having a base, collector and an emitter. An input circuit is coupled between base and emitter. An output circuit is coupled between emitter and collector. A transmitter keying circuit having a keying switch and a keying relay. A CIRCUIT CONNECTING DEVICE connected between the keying switch and the keying relay and the transistor emitter. An input signal, for example, an audio input signal, is applied to the input circuit. When the keying switch is closed, the keying relay is energized, permitting transmitter function, and the transistor amplifier is also energized at the same time through the CIRCUIT CONNECTING DEVICE, the input signal appears in amplified form at the amplifier output circuit.

DETAILED DESCRIPTION OF PREFERRED EMBODIMENTS

Figure 1:
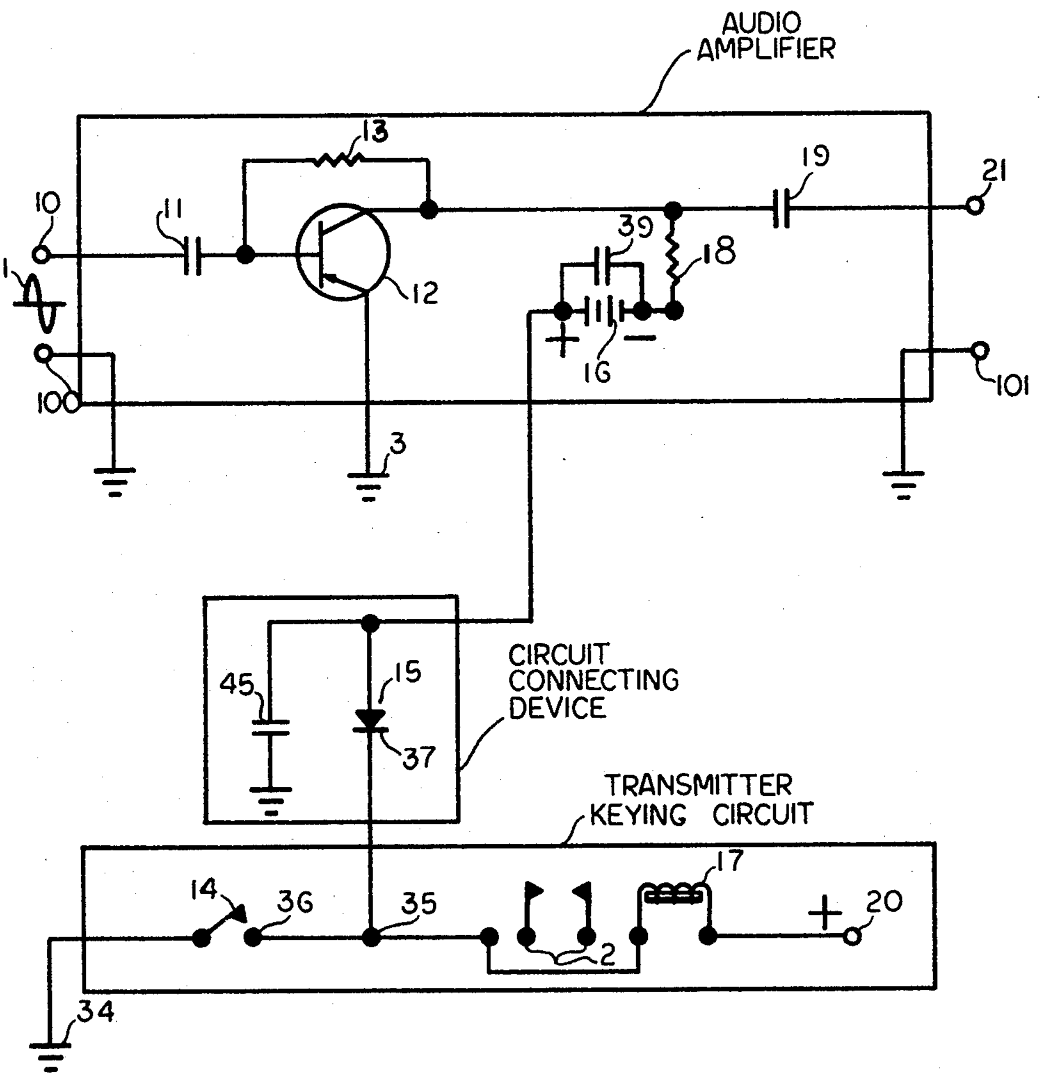
FIG. 1 is an open circuit schematic diagram showing the connecting of component parts into a power switching circuit using a PNP transistor and showing the transmitter keying relay and modulation amplifier un-energized.

FIG. 1 is the circuit diagram of a conventional transistor amplifier consisting of electronic parts as follows.

10 audio input terminal, 11 audio input coupling capacitor,

12 PNP transistor, 13 bias resistor, 18 collector load resistor,

16 battery, transistor power source.

FIG. 1 also shows transmitter parts as follows:

Terminal 20, to which is supplied transmitter relay keying voltage, transmitter keying relay 17, transmitter keying switch 14.

FIG. 1 also shows the CIRCUIT CONNECTING DEVICE, part 15 and part 45.

Following is a description of the principal of operation of the circuit connecting device as shown in the figures.

FIG. 1, open circuit description:

When the transmitter keying switch 14 is open, and when a positive relay keying voltage is supplied to the terminal 20, and to the transmitter keying relay 17, and to the circuit connecting diode 15, the diode being polarized in the inverse current direction with respect to the positive relay keying voltage, presents a high resistance to the relay keying voltage and prevents current flow through the diode, the keying relay remains un-energized, permitting no transmitter function 2, and the transistor 12 also remains un-energized at the same time and no amplified signal voltage appears the audio output terminal 21.

Figure 1A:
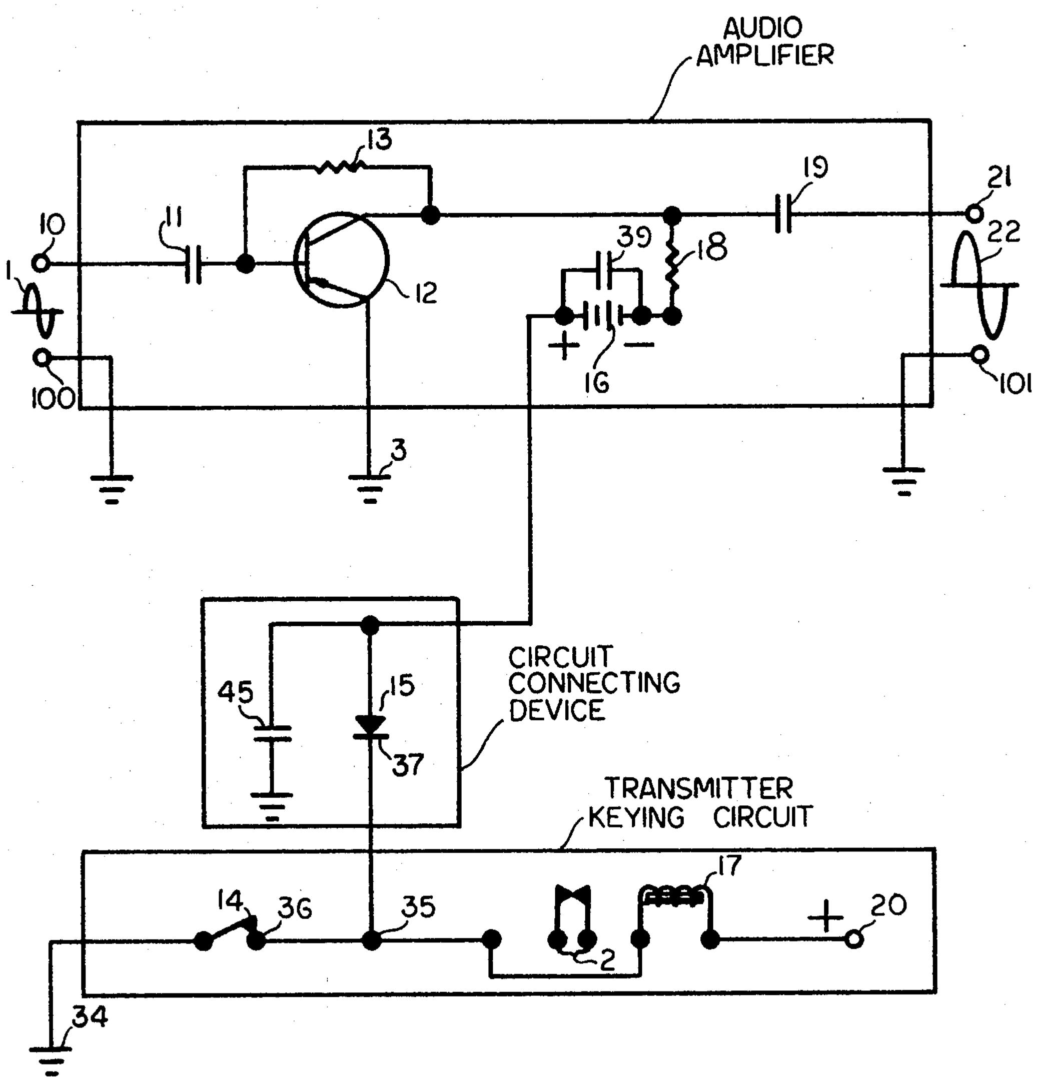
FIG. 1*a* is a closed circuit schematic diagram showing the connecting of component parts into a power switching circuit using a PNP transistor and showing the transmitter keying relay and modulation amplifier energized.

FIG. 1*a*, closed circuit description:

When the transmitter keying switch 14 is closed, and when a positive relay keying voltage is supplied to the terminal 20, electrons are supplied from the ground terminal 34 through the keying switch 14, to the terminal 20, energizing the transmitter keying relay 17, permitting the transmitter function 2, and also completing the audio amplifier power supply connection from the negative terminal of the battery 16, through the load resistor 18, the transistor 12, to the ground connection 3, to the ground connection 34, through the keying switch 14, through the circuit connecting diode 15, to the positive terminal of the battery 16, thereby energizing the transistor amplifier circuit which results in the amplification of the audio signal 1 applied to the input terminal 10, and the amplified audio signal 22 appears the output terminal 21.

The diode bypass capacitor 45, presents a low impedance path for the audio signal around the low foreward current resistance of the circuit connecting diode 15.

Figure 2:
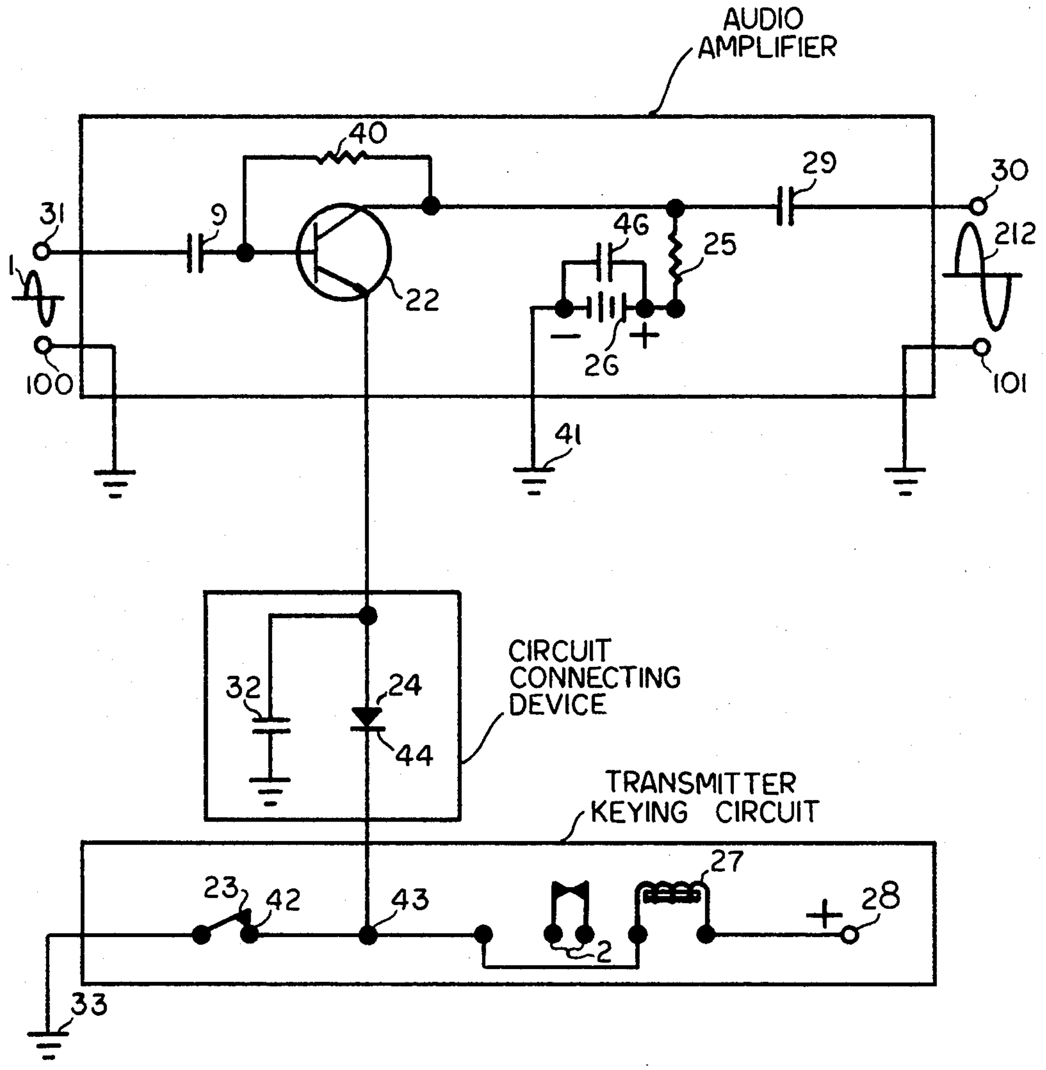
FIG. 2 is a closed circuit schematic diagram showing the connecting of component parts into a power switching circuit using an NPN transistor and showing the transmitter keying relay and modulation amplifier energized.

Referring now to FIG. 2, the open circuit principal of operation of the circuit connecting device, diode 24, capacitor 32, is the same as for FIG. 1, however, in FIG. 2 the circuit connecting system is energizing an NPN transistor circuit described as follows.

FIG. 2, closed circuit description: When the transmitter keying switch 23 is closed, and when a positive relay keying voltage is supplied to the terminal 28, electrons are supplied from the ground terminal 33 through the keying switch 23, energizing the transmitter keying relay 27, permitting the transmitter function 2, and also completing the audio amplifier power supply connection from the negative terminal of the battery 26, to the ground terminal 41, to the ground terminal 33, through the keying switch 23, and the circuit connecting diode 24, to the transistor 22, which results in the amplification 212 of the audio signal 1 applied to the input terminal 31 aand the amplified audio signal 212 appears at terminal 30.

The diode bypass capacitor 32, presents a low impedance path for the audio signal around the low forward current resistance of the circuit connecting diode 24.

Figure 3:
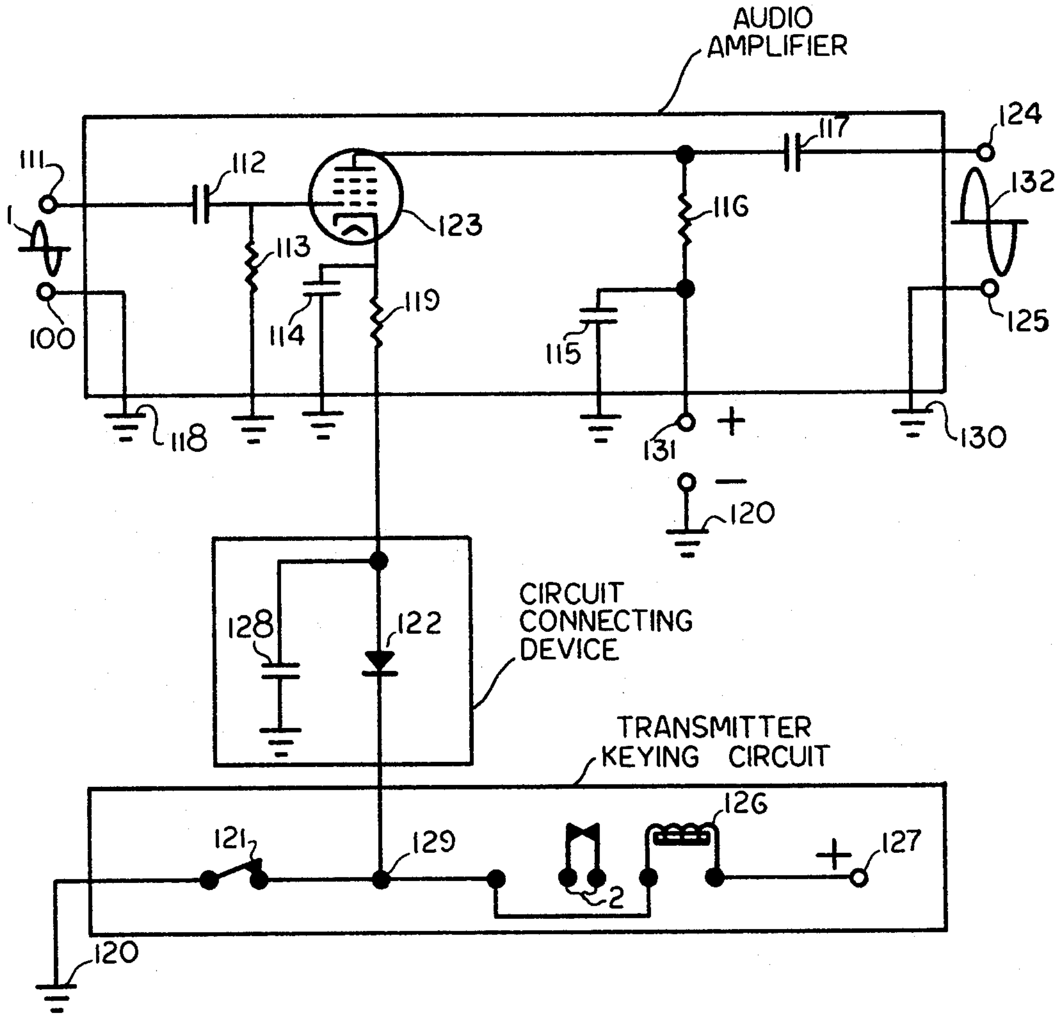
FIG. 3 is a closed circuit schematic diagram showing the connecting of component parts into a power switching circuit using a VACUUM TUBE and showing the transmitter keying relay and modulation amplifier energized.

Referring now to FIG. 3, the open circuit principal of operation of the circuit connecting device, diode 122 and capacitor 128, is the same as for FIG. 1, however, the circuit connecting system in FIG. 3 is energizing a vacuum tube amplifier circuit, described as follows.

FIG. 3, closed circuit description: When the transmitter keying switch 121 is closed, and a positive relay keying voltage is supplied to the terminal 127, electrons are supplied from the ground terminal 120 through the keying switch 121, energizing the transmitter keying relay 126, permitting the transmitter function 2, and also completing the audio amplifier power supply circuit connection from the negative ground terminal 120 of the power source, through the keying switch 121, and the circuit connecting diode 122, to the vacuum tube 123, the load resistor 116, to the positive terminal 131 of the power source, thereby energizing the vacuum tube amplifier 123, which results in the amplification of the audio signal applied to the input terminal 111 and the amplified audio signal 132 appears at the output terminal 124.

The diode bypass capacitor 128, presents a low impedance path for the audio signal around the low forward current resistance of the circuit connecting diode 122.

Some of the advantages of the circuit connecting device are, as a microphone pre-amplifier connecting device, it permits connection and operation of the audio amplifier and transmitter with fewer and smaller component parts, and with more simplified operation.

While I have described my invention with particular reference to the drawings, my protection is to be limited only by the terms of the claim which follows.

It will become apparent that certain changes and modifications can be made without departing from the scope of the invention as claimed:

1. A modulation amplifier and power switching circuit therefore for a transmitter comprising; a current control device having at least current injection, collection and control electrodes; a modulation signal input circuit coupled between said injection and control electrodes, a modulation signal output circuit connected between said injection and collection electrodes, an amplified version of the input signal appearing at said output circuit for modulating said transmitter when said control device is energized; a transmitter keying circuit having a transmitter keying switch, a transmitter keying relay having a coil and a pair of terminals for connecting of power for operating said relay, said keying switch, relay coil and terminals being connected in series; a load resistor having two terminals, one of said terminals being connected to said collecting electrode, a current supply source having two terminals with one of said current supply source terminals being connected to the other terminal of said load resistor and the other terminal of said current supply source connected to the terminal of said keying switch that is connected to said power terminal, a diode connected between the other terminal of said keying switch and the injection electrode of said control device, and a bypass capacitor coupled between said injection electrode and the terminal of said current supply source connected to said keying switch, whereby when said keying switch is closed said transmitter keying relay and modulation amplifier are energized.

* * * * *